United States Patent
Gaknoki et al.

(10) Patent No.: US 9,572,224 B2
(45) Date of Patent: Feb. 14, 2017

(54) BLEEDER PROTECTION USING THERMAL FOLDBACK

(71) Applicant: Power Integrations, Inc., San Jose, CA (US)

(72) Inventors: Yury Gaknoki, San Jose, CA (US); Mingming Mao, Saratoga, CA (US); Tiziano Pastore, Los Gatos, CA (US); Ricardo Luis Janezic Pregitzer, Campbell, CA (US); Michael Yue Zhang, Mountain View, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 14/731,014

(22) Filed: Jun. 4, 2015

(65) Prior Publication Data
US 2016/0135257 A1    May 12, 2016

Related U.S. Application Data

(60) Provisional application No. 62/077,121, filed on Nov. 7, 2014.

(51) Int. Cl.
*H05B 37/02* (2006.01)
*H05B 33/08* (2006.01)

(52) U.S. Cl.
CPC .......... *H05B 33/0887* (2013.01); *H05B 33/08* (2013.01); *H05B 33/0815* (2013.01); *H05B 37/02* (2013.01); *Y02B 20/341* (2013.01)

(58) Field of Classification Search
CPC ..... H05B 33/08; H05B 37/02; H05B 33/0815; H05B 33/0887
USPC ..... 315/209 R, 224, 274, 276, 291, 307–309
See application file for complete search history.

(56) References Cited

U.S. PATENT DOCUMENTS

| | | | | |
|---|---|---|---|---|
| 2013/0343090 A1* | 12/2013 | Eom | ................. | H02M 3/33507 363/16 |
| 2014/0159616 A1* | 6/2014 | Wang | ................. | H05B 33/0845 315/307 |
| 2014/0225532 A1* | 8/2014 | Groeneveld | ...... | H02M 3/33507 315/307 |
| 2015/0048757 A1* | 2/2015 | Boonen | ............. | H05B 33/0845 315/294 |

* cited by examiner

*Primary Examiner* — Tung X Le
(74) *Attorney, Agent, or Firm* — Blakely Sokoloff Taylor & Zafman LLP

(57) ABSTRACT

Thermally protected bleeder circuits for maintaining an input current of a power converter above a dimmer circuit holding current are disclosed. In one example, a bleeder control circuit may generate a bleeder control signal to control a bleeder current of the bleeder circuit based on an input current signal and a temperature signal. The bleeder control circuit may cause the bleeder current to be substantially equal to zero in response to the input current signal being greater than or equal to a reference signal, and may cause the bleeder current to be proportional to a difference between the input current signal and the reference signal in response to the input current signal being less than the reference signal. The reference signal may be constant for temperatures less than a threshold temperature, but may decrease with respect to increases in temperature for temperatures greater than the threshold temperature.

18 Claims, 6 Drawing Sheets

BLEEDER PROTECTION USING THERMAL FOLDBACK

CROSS-REFERENCE TO RELATED APPLICATIONS

This application claims the benefit of U.S. Provisional Application No. 62/077,121 filed Nov. 7, 2014, the contents of which are incorporated herein by reference.

BACKGROUND

1. Field

The present disclosure relates generally to power converters and, more specifically, to power converters utilized with dimmer circuits.

2. Related Art

Residential and commercial lighting applications often include dimmers to vary the brightness of the outputted light. A dimmer circuit typically disconnects a portion of an alternating current (ac) input voltage to limit the amount of voltage and current supplied to an incandescent lamp. This is known as phase dimming because it is often convenient to designate the position of the dimmer circuit and the resultant amount of missing voltage in terms of a fraction of the period of the ac input voltage measured in degrees. In general, the ac input voltage is a sinusoidal waveform and the period of the ac input voltage is referred to as a full line cycle. As such, half the period of the ac input voltage is referred to as a half line cycle. An entire period has 360 degrees, and a half line cycle has 180 degrees. Typically, the phase angle is a measure of how many degrees (from a reference of zero degrees) of each half line cycle the dimmer circuit disconnects. On the other hand, the conduction angle is a measure of how many degrees (from a reference of zero degrees) of each half line cycle the dimmer circuit does not disconnect a portion the ac input voltage. In other words, the conduction angle is a measure of how many degrees of each half line cycle in which the dimmer circuit is conducting. In one example, the removal of a quarter of the ac input voltage in a half line cycle may correspond to a phase angle of 45 degrees but a conduction angle of 135 degrees.

Although phase angle dimming works well with incandescent lamps that receive the altered ac input voltage directly, it typically creates problems for light emitting diode (LED) lamps. LED lamps often require a regulated power converter to provide regulated current and voltage from the ac power line. Most LEDs and LED modules are best driven by a regulated current, which may be provided by a regulated power converter from an ac power line. Dimmer circuits typically don't work well with conventional regulated power converters and their respective controllers. Regulated power converters are typically designed to ignore distortions of the ac input voltage and to deliver a constant regulated output. As such, conventional regulated power supplies would not satisfactorily dim the LED lamp. Unless a power converter for an LED lamp is specially designed to recognize and respond to the voltage from a dimmer circuit in a desirable way, a dimmer is likely to produce unacceptable results, such as flickering or shimmering of the LED lamp with large conduction angles and flashing of the LED lamp at low conduction angles.

BRIEF DESCRIPTION OF THE DRAWINGS

Non-limiting and non-exhaustive embodiments of the present technology are described with reference to the following figures, wherein like reference numerals refer to like parts throughout the various views unless otherwise specified.

Figure 1:
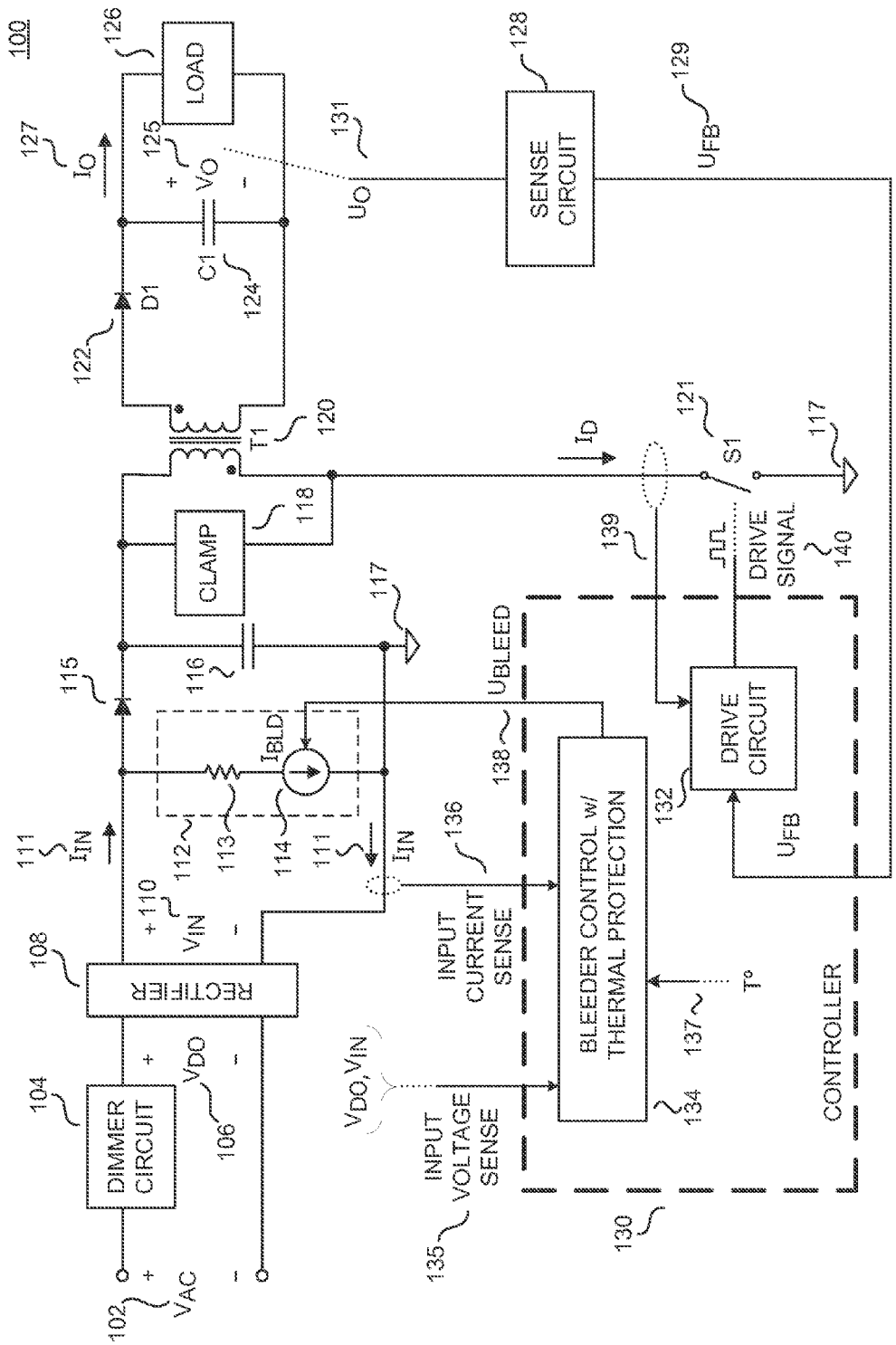
FIG. 1 is a functional block diagram illustrating an example power converter with a dimmer circuit utilizing a controller according to various examples.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present technology. It will be apparent, however, to one having ordinary skill in the art that the specific detail need not be employed to practice the present technology. In other instances, well-known materials or methods have not been described in detail in order to avoid obscuring the present technology.

Reference throughout this specification to "one embodiment", "an embodiment", "one example", or "an example" means that a particular feature, structure or characteristic described in connection with the embodiment or example is included in at least one embodiment of the present disclosure. Thus, appearances of the phrases "in one embodiment", "in an embodiment", "one example", or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

To provide a thorough understanding of the present technology, numerous details have been set forth and, in some cases, simplified equivalent implementation circuits have been described. However, it will be apparent to one having ordinary skill in the art that the equivalent simplified circuits may differ from the actual implementations and that all specific details need not be employed to practice the various examples. Additionally, it should be appreciated that in the description below and in all described examples, a switched-mode power supply may include a controller incorporated into an IC having some or none of the switching and power components in a monolithic or hybrid structure.

One example of a phase dimming circuit is a TRIAC dimmer. A TRIAC is a semiconductor component that behaves as a controlled ac switch. In other words, it behaves as an open switch to an ac voltage until it receives a trigger signal at a control terminal, which causes the switch to close. The TRIAC begins conducting when the current through the switch is above a value referred to as a latching current. The switch remains closed as long as the current through the switch is above a value referred to as the holding current. Most incandescent lamps use more than enough current from the ac power source to allow reliable and consistent operation of a TRIAC. However, the low current used by efficient power converters to drive LED lamps may not provide enough current to keep a TRIAC conducting for the expected portion of the ac line period. Further, the high frequency transition of the sharply increasing input voltage when the TRIAC fires during each half line cycle causes inrush input current ringing that may reverse several times during the half line cycle. During these current reversals, the TRIAC may prematurely turn off and cause flickering in the LED lamp. Power converter controller designs usually rely on the power converter including a dummy load, sometimes called a bleeder circuit, to provide enough extra current for the input of the power converter to keep the TRIAC conducting. In addition, the bleeder circuit may be utilized to keep the current through the TRIAC above the holding current.

Conventional bleeder circuits may include a series damping resistor, which is coupled between the TRIAC and the input of the power converter. However, the series damping resistor conducts (and therefore dissipates power) while a voltage is present. As such, use of a series damping resistor affects the efficiency of the overall power conversion system. Active bleeder circuits may be utilized to provide enough extra current for the input of the power converter when the dimmer circuit is present. The active bleeder circuit may be disabled when the dimmer circuit is not present. In one example, the active bleeder circuit may be exemplified as a controlled current source that provides a variable current. However, components within the bleeder circuit may be susceptible to temperature. For example, the controlled current source may be exemplified as bipolar junction transistors (BJTs) coupled as a Darlington pair. As temperature increases, the current through the BJT may increase. The current may increase to a value that may be harmful to the BJT.

When the dimmer circuit is conducting, the bleeder circuit may be controlled to keep the input current of the power converter above the holding current of the phase dimmer. When the input current reaches the holding current threshold, the bleeder circuit may be controlled to provide additional bleed current to increase the input current above the holding current. However, when the temperature is greater than a temperature threshold, the bleeder circuit may be controlled to reduce the input current of the power converter. As such, the current through the bleeder circuit is also reduced as the temperature increases.

Referring first to FIG. 1, a functional block diagram of an example power converter 100 is illustrated including a dimmer circuit 104, a rectifier 108, a bleeder circuit 112, a diode 115, an input capacitance 116, an input return 117, a clamp circuit 118, an energy transfer element T1 120, a switch S1 121, a rectifier D1 122, an output capacitor C1 124, a sense circuit 128, and a controller 130. The bleeder circuit 112 is shown as including a resistance 113 and a controlled current source 114 that provides a bleed current $I_{BLD}$. Controller 130 includes a drive circuit 132 and a bleeder control circuit 134. In one example, sense circuit 128 may also be included in controller 130. FIG. 1 further illustrates an ac input voltage $V_{AC}$ 102, a dimmer output voltage $V_{DO}$ 106, an input voltage $V_{IN}$ 110, an input current $I_{IN}$ 111, an input voltage sense signal 135, an input current sense signal 136, an output voltage $V_O$ 125, an output current $I_O$ 127, an output quantity $U_O$ 131, a feedback signal $U_{FB}$ 129, a temperature signal 137, a bleeder control single $U_{BLEED}$ 138, and a switch current sense signal 139. Although a single controller is illustrated in FIG. 1, it should be appreciated that multiple controllers may be utilized. In addition, the drive circuit 132 and bleeder control circuit 134 need not be within a single controller. For example, the power converter 100 may have a primary and a secondary controller coupled to the input and the output side, respectively, of the power converter 100. The example switched mode power converter 100 illustrated in FIG. 1 is coupled in a flyback configuration, which is just one example of a switched mode power converter that may benefit from the teachings of the present disclosure. It is appreciated that other known topologies and configurations of the switched mode power converter may also benefit from the teachings of the present disclosure.

The power converter 100 provides output power to the load 126 from an unregulated ac input voltage $V_{AC}$ 102, also referred to as a line signal. As shown, dimmer circuit 104 receives the ac input voltage $V_{AC}$ 102 and produces the dimmer output voltage $V_{DO}$ 106. The dimmer circuit 104 may be utilized to limit the voltage delivered to the power converter 100. For the example of an LED load, when the dimmer circuit 104 limits the amount of voltage delivered to the power converter, the resultant current delivered to the load of LED arrays is also limited and the LED array dims. Depending on the amount of dimming desired, the dimmer circuit 104 controls the amount of time the ac input voltage $V_{AC}$ 102 is disconnected from the power converter. In general, a greater amount of desired dimming corresponds to a longer period of time during which the dimming circuit 104 disconnects the ac input voltage $V_{AC}$ 102. In one example, the dimmer circuit 104 may be a phase dimming circuit, such as a TRIAC phase dimmer. The dimmer circuit 104 further couples to the rectifier 108 and the dimmer output voltage $V_{DO}$ 106 is received by the rectifier 108. The rectifier 108 outputs the input voltage $V_{IN}$ 110. In one example, rectifier 108 may be a bridge rectifier. The rectifier 108 further couples to the bleeder circuit 112 and the diode 115. Diode 115 is coupled as a blocking diode to prevent current from flowing from the capacitance 116 to the bleeder circuit 112. The other end of diode 115 is further coupled to the energy transfer element T1 120. In some examples, the energy transfer element T1 120 may be a coupled inductor or may be a transformer. As shown, the energy transfer element T1 120 includes two windings, a primary winding and a secondary winding. However, the energy transfer element T1 120 may have more than two windings. The primary winding of the energy transfer element T1 120 is further coupled to switch S1 121, which is then further coupled to input return 117. The clamp circuit 118 is illustrated in the example of FIG. 1 as being coupled across the primary winding of the energy transfer element T1 120. The input capacitor 116 may couple across the primary winding and switch S1 121. In other words, the filter capacitor 116 may be coupled across the diode 115 and the bleeder circuit 112 and filter high frequency current from the power switch S1 121. As illustrated, the bleeder circuit 112 may include a resistance 113, which is coupled to the diode 115, and a controlled current source 114, which is coupled to input return 117. The bleeder circuit 112 provides additional current (exemplified as bleed current $I_{BLD}$) to keep the current through the dimmer circuit 104 (shown as input current $I_{IN}$) above the holding threshold.

The secondary winding of the energy transfer element T1 120 is coupled to the rectifier 122, which is exemplified as diode D1. However, in some examples, the rectifier 122 may be a transistor used as a synchronous rectifier. Both the output capacitor C1 124 and load 126 are shown as being coupled to the rectifier 122. An output is provided to the load 126 as a regulated output voltage $V_O$ 125, regulated output current $I_O$ 127, or a combination of the two. In one example, the load 126 may be an LED array.

The power converter 100 further includes circuitry to regulate the output, which is exemplified as output quantity $U_O$ 131. In general, the output quantity $U_O$ 131 is either an output voltage $V_O$ 125, output current $I_O$ 127, or a combination of the two. A sense circuit 128 is coupled to sense the output quantity $U_O$ 131 and to provide the feedback signal $U_{FB}$ 129, which is representative of the output quantity $U_O$ 131, to the controller 130. The controller 130 further includes terminals to receive the input sense signal 135 (which is representative of the input voltage $V_{IN}$ 110 or the dimmer output voltage $V_{DO}$ 106), the input current sense signal 136, (which is representative of the input current $I_{IN}$ 111), and the switch current sense signal 139 (representative of the switch current $I_D$), and to provide the drive signal 140 to the power switch 121. The controller 130 provides drive signal 140 to control various switching parameters (e.g., switch on-time, switch off-time, duty ratio, the number of pulses per unit time, or the like) of the power switch 121 to control the transfer of energy from the input to the output of the power converter 100. In one example, the sense circuit 128 may sense the output quantity $U_O$ 131 from an additional winding included in the energy transfer element T1 120. In another example, the sense circuit 128 may utilize a voltage divider to sense the output quantity $U_O$ 131 from the output of the power converter 100. The controller 130 also provides the bleeder control signal $U_{BLEED}$ 138 to the controlled current source 114 to control when the bleeder circuit 112 provides the bleed current $I_{BLD}$ and/or the amount of bleed current $I_{BLD}$ provided for the power converter 100.

As illustrated in the example of FIG. 1, the controller 130 includes the drive circuit 132 and the bleeder control circuit 134. As will be further discussed, the bleeder control circuit 134 further includes thermal protection. The drive circuit 132 is coupled to output the drive signal 140 in response to the feedback signal $U_{FB}$ 129. In addition, drive circuit 132 may also be coupled to be responsive to the current sense signal 139. Bleeder control circuit 134 is coupled to receive the input voltage sense signal 135, input current sense signal 136, and the temperature signal 137, and is coupled to output the bleeder control signal $U_{BLEED}$ 138. The bleeder control signal $U_{BLEED}$ 138 controls the amount of current provided by the controlled current source 114.

In operation, the controller 130 enables the bleeder circuit 112 by sensing whether the dimmer circuit 104 is disconnecting portions of the ac input voltage $V_{AC}$ 102. The bleeder control circuit 134 may determine whether the dimmer circuit 104 is disconnecting portions of the ac input voltage $V_{AC}$ 102 through the input voltage $V_{IN}$ 110 or the dimmer output voltage $V_{DO}$ 106. In one example, the bleeder circuit control circuit 134 may enable the bleeder circuit 112 when the input voltage $V_{IN}$ 110 is greater than a threshold.

As mentioned above, the bleeder circuit 112 also provides a bleeder current $I_{BLD}$ to keep the input current $I_{IN}$ 111 above the holding current of the dimmer circuit 104. The input current $I_{IN}$ 111 is provided to the bleeder control circuit 134 through the input current sense signal 136. As will be further discussed, the bleeder control circuit 134 regulates the sensed input current $I_{IN}$ 111 by determining the difference between the input current sense signal 136 to a reference signal. In response to the difference, the bleeder control circuit 134 outputs the bleeder signal $U_{BLEED}$ 138 to the controlled current source 114 of the bleeder circuit 112. The amount of current (bleed current $I_{BLD}$) provided by the controlled current source 114 is in response to the comparison of the input current sense signal 136 to the reference signal. The reference signal is partially representative of the holding current of the dimmer circuit 104. If the sensed input current $I_{IN}$ 111 is less than the reference signal, the bleeder control circuit 134 controls the bleeder circuit 112 to provide an additional bleeder current $I_{BLD}$ to keep the input current $I_{IN}$ 111 substantially equal to or above the reference signal (and as such, above the holding current of the dimmer circuit 104). In other words, the input current $I_{IN}$ 111 may be regulated to the value of the reference signal of the bleeder control circuit 134.

The bleeder control circuit 134 further provides thermal protection to the bleeder circuit 112 by varying the value of the reference signal in response to the sensed temperature. As mentioned above, due to the properties of the controlled current source 114, increases in temperature may result in an increase of current outside of safe operating regions. The temperature signal 137 provides the sensed temperature, which may be the temperature of the housing of the power converter, the ambient temperature surrounding the controller 130, the temperature of the controller 130, the temperature of the energy transfer element 120, the temperature of the load 126, the temperature of the heat sink of the load 126, the temperature of the power switch 121, the temperature of the bleeder circuit 112, or the electrolytic temperature. The temperature signal 137 may provide the sensed temperature of one point of the power converter. In other words, the bleeder control circuit 134 includes a temperature varying reference signal. Further, the temperature may be sensed using a negative temperature coefficient (NTC) resistance or a positive temperature coefficient (PTC) resistance. In one example, if the temperature is greater than a threshold, the reference signal is reduced. As a result, the input current $I_{IN}$ 111 is regulated to a lower value and the bleeder current IBM is also reduced.

Figure 2:
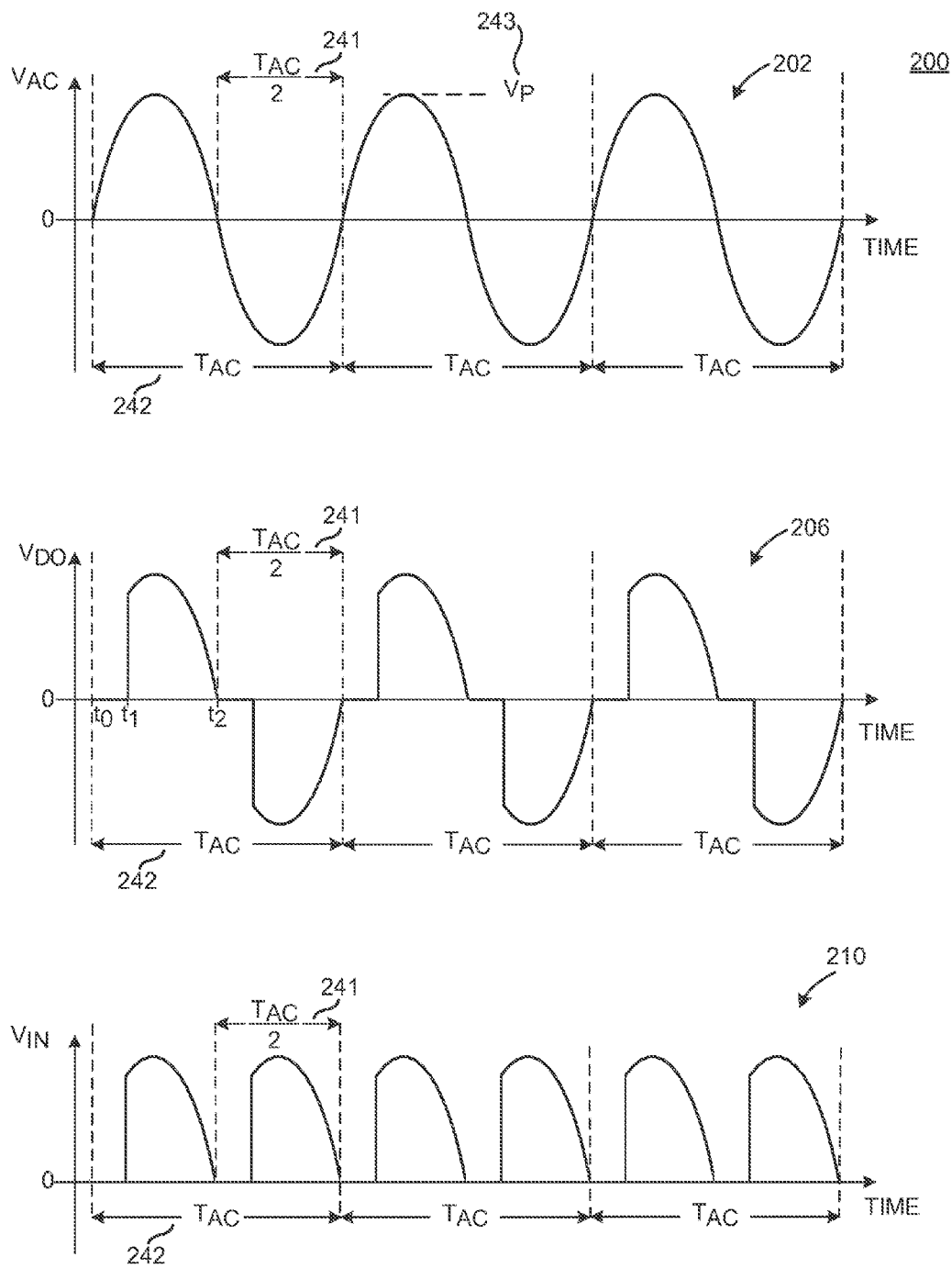
FIG. 2 is a diagram illustrating example waveforms of an ac input voltage, an output voltage of a dimmer circuit, and an output of a rectifier circuit of FIG. 1 according to various examples.

FIG. 2 illustrates example waveforms 200 of an ac input voltage 202, a dimmer output voltage $V_{DO}$ 206, and an input voltage $V_{IN}$ 210. In particular, FIG. 2 illustrates the dimmer output voltage $V_{DO}$ 206 and resultant input voltage $V_{IN}$ 210 for a leading edge dimmer circuit.

In general, the ac input voltage $V_{AC}$ 202 is a sinusoidal waveform with the period of the ac input voltage $V_{AC}$ 202 referred to as a full line cycle $T_{AC}$ 242. Mathematically: $V_{AC}=V_P \sin(2\pi f_L t)$. Where $V_P$ 243 is the peak voltage of the ac input voltage $V_{AC}$ and $f_L$ is the frequency of the ac input voltage. It should be appreciated that the full line cycle $T_{AC}$ 242 is the reciprocal of the line frequency $f_L$, or mathematically:

$$T_{AC} = \frac{1}{f_L}.$$

As shown in FIG. 2, a full line cycle $T_{AC}$ 242 of the ac input voltage 202 is denoted as the length of time between every other zero-crossing of the ac input voltage 202. Further, the half line cycle $T_{AC/2}$ 241 is the reciprocal of double the line frequency, or mathematically:

$$T_{AC/2} = \frac{1}{2f_L}.$$

As shown, the half line cycle $T_{AC/2}$ 241 of the ac input voltage $V_{AC}$ 202 is denoted as the length of time between consecutive zero-crossings.

For leading edge dimming, the ac input voltage $V_{AC}$ 202 is disconnected from the power converter at the beginning of each half line cycle $T_{AC/2}$ 241 and the dimmer output voltage $V_{DO}$ 206 is substantially equal to zero (shown as between time $t_0$ and time $t_1$). After a given amount of time, the dimmer circuit 104 connects the ac input voltage $V_{AC}$ 202 to the power converter 100 and the dimmer output voltage $V_{DO}$ 206 substantially follows the ac input voltage $V_{AC}$ 202 for the rest of the half line cycle $T_{AC/2}$ 241 (shown as between time $t_1$ and time $t_2$). The rectifier circuit 108 rectifies the dimmer output voltage $V_{DO}$ 206, thus providing the input voltage $V_{IN}$ 210 as shown. Or mathematically: $V_{IN}=|V_{DO}|$.

Figure 3:
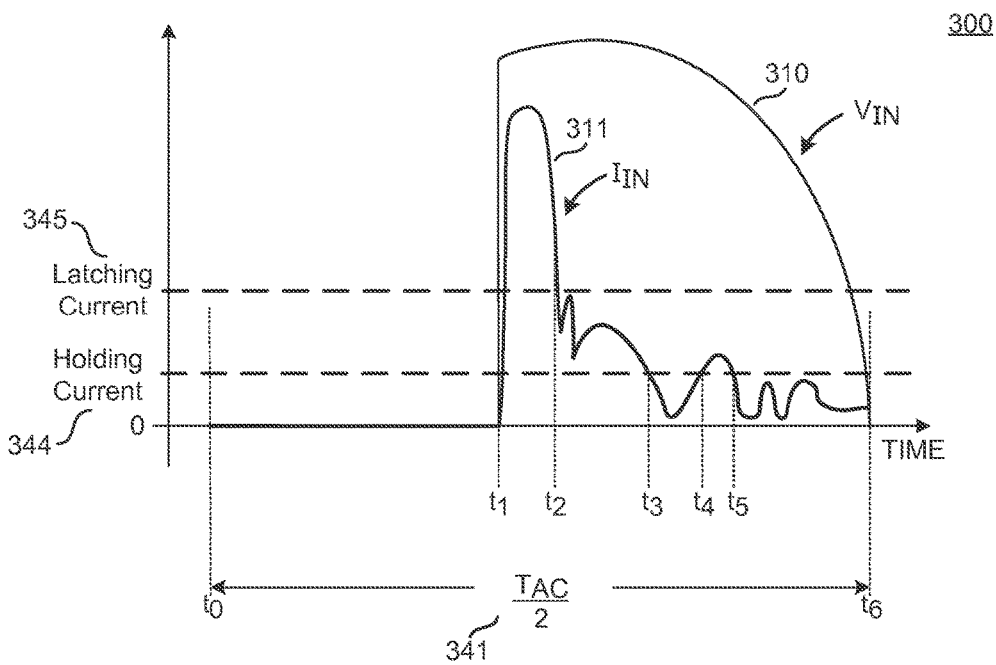
FIG. 3 is a diagram illustrating example waveforms of an input voltage waveform and an input current waveform.

FIG. 3 illustrates a graph 300 including an example input signal YIN 310 waveform and input current $I_{IN}$ 311 waveform. In particular, FIG. 3 shows an example input signal $V_{IN}$ 310 waveform and input current $I_{IN}$ 311 waveform for one half line cycle $T_{AC/2}$ 341 as output by a dimmer circuit without the inclusion of a bleeder circuit.

As discussed above, the voltage of input signal $V_{IN}$ is substantially zero at the beginning of half line cycle $T_{AC/2}$ 341. When the dimmer circuit reconnects the ac line voltage $V_{AC}$, the voltage of input signal $V_{IN}$ 310 increases quickly and substantially follows the voltage of ac line voltage $V_{AC}$ for the remainder of the half line cycle $T_{AC/2}$ 341. At the beginning of the half line cycle $T_{AC/2}$ 341, the input current $I_{IN}$ 311 is also substantially zero until the dimmer circuit fires. Once the dimmer circuit fires, the input current $I_{IN}$ 311 also increases quickly. In an example using a TRIAC dimmer circuit, the TRIAC may begin conducting when the current through the switch is above latching current 345. As shown in FIG. 3, without the inclusion of a bleeder circuit, the input current $I_{IN}$ 311 may ring. This is partially due to an input capacitor included within the power converter and other inductive and capacitive elements included within the power converter. As illustrated in FIG. 3, the input current $I_{IN}$ 311 may reverse polarity several times during the half line cycle $T_{AC/2}$ 341 as a consequence of the ringing. If the input current $I_{IN}$ 311 falls below the holding current 344 of the dimmer circuit before the end of the half line cycle $T_{AC/2}$ 341 (shown between times $t_3$ and $t_4$), or before the input signal $V_{IN}$ 310 has reached zero, the dimmer circuit may prematurely turn off and cause flickering in the load driven by the power converter.

Figure 4:
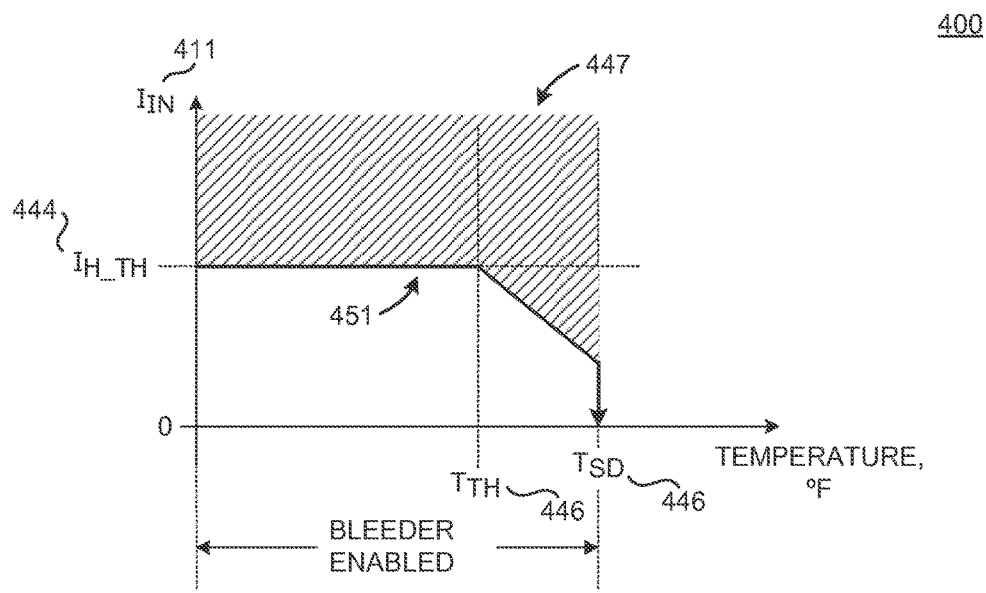
FIG. 4 is a diagram illustrating an example input current operating region over temperature according to various examples.

FIG. 4 illustrates a graph 400 of an example input current operating region 447 over temperature when the bleeder circuit is enabled. As illustrated, the input current $I_{IN}$ 411 may operate in region 447 (shown as dashed lines). Line 451 illustrates the minimum operating value of the input current $I_{IN}$ 411. As illustrated, the minimum operating value 451 of the input current $I_{IN}$ 411 is substantially equal to the holding current threshold $I_{H\_TH}$ 444 (which is representative of the holding current 344 discussed above with respect to FIG. 3) for temperatures less than the temperature threshold $T_{TH}$ 446. In other words, the input current $I_{IN}$ 411 is controlled such that the input current $I_{IN}$ 411 does not fall below the holding current of the dimmer circuit. In one example, the input current $I_{IN}$ 411 is kept above the holding current threshold $I_{H\_TH}$ 444 by providing the bleeder current $I_{BLD}$ at a sufficient level to maintain the input current $I_{IN}$ 411 above the holding current threshold $I_{H\_TH}$ 444.

For temperatures greater than the temperature threshold $T_{TH}$ 446, the minimum operating value 451 may decrease from the holding current threshold $I_{H\_TH}$ 444. The temperature threshold $T_{TH}$ 446 may correspond to the temperature at which components of the bleeder circuit may be more susceptible to damage due to increased current due to temperature. The decrease shown is linear. However, the decrease of the minimum operating value 451 may be non-linear. Since the minimum operating value 451 is less for temperatures above the temperature threshold $T_{TH}$ 446, the bleeder circuit may not provide as much bleeder current $I_{BLD}$ to keep the input current $I_{IN}$ 411 above the minimum operating value 451. As such, the current through the bleeder circuit may be decreased at temperatures greater than the temperature threshold $T_{TH}$ 446. At a threshold $T_{SD}$ 446, which may correlate to the shutdown of the bleeder circuit and the power converter, the minimum operating value 451 may fall substantially to zero and the input current $I_{IN}$ 411 is also reduced to substantially zero.

Figure 5:
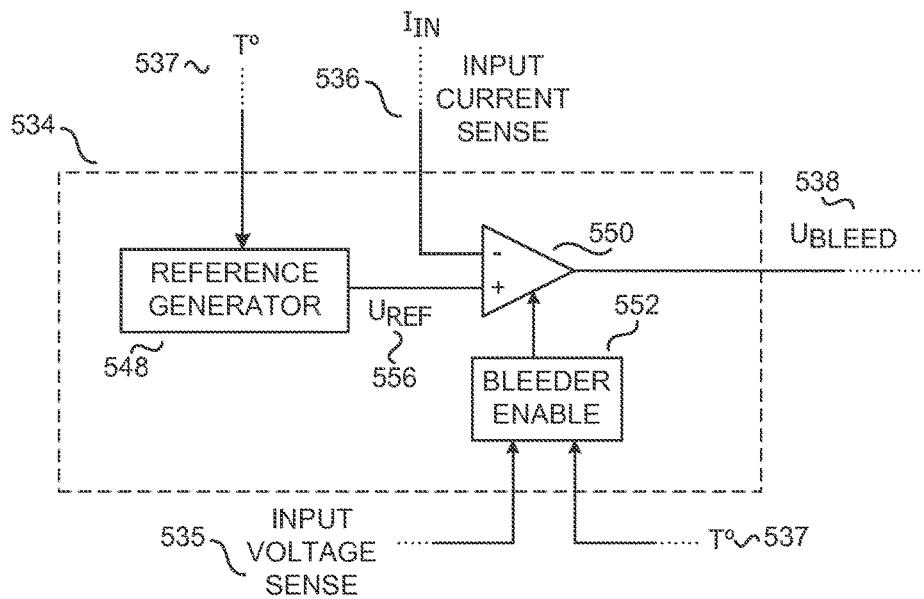
FIG. 5 is a functional block diagram of an example bleeder control circuit according to various examples.

FIG. 5 illustrates an example bleeder control circuit 534 including a reference generator 548, amplifier 550, and bleeder enable circuit 552. Further illustrated in FIG. 5 are input voltage sense signal 535, input current sense signal 536, temperature signal 537, reference signal $U_{REF}$ 556, and bleed signal $U_{BLEED}$ 538. It should be appreciated that similarly named and numbered elements couple and function as described above. For example, signals 535, 536, 537, and 538 may correspond to signals 135, 136, 137, and 138, respectively.

As illustrated, the reference generator 548 is coupled to receive the temperature signal 537 and output the reference signal $U_{REF}$ 556. The amplifier 550 is coupled to receive the reference signal $U_{REF}$ 556 and the input current sense signal 536 (which is representative of the input current $I_{IN}$ discussed above). As illustrated, the input current sense signal 536 is coupled to be received at the inverting input while the reference signal $U_{REF}$ 556 is received at the non-inverting input of the amplifier 550. The bleeder enable circuit 552 is coupled to receive the input voltage sense signal 535 and the temperature signal 537. The bleeder enable circuit 552 outputs an enable signal to the amplifier 550, which enables or disables the amplifier 550.

In operation, the bleeder enable circuit 552 may enable or disable the amplifier 550 in response to the input voltage sense signal 535 and the temperature signal 537. In one example, the bleeder enable circuit 552 may monitor the input voltage sense signal 535 to determine whether the dimmer circuit is conducting and/or performing dimming. If the dimmer circuit is conducting (and/or performing dimming) and the temperature (as indicated by temperature signal 537) is below a temperature threshold, such as threshold $T_{TH}$ 446, the bleeder enable circuit 535 may enable the amplifier 550. In one example, the bleeder enable circuit 535 may determine if the dimmer circuit is conducting by comparing the input voltage sense signal 535 (representative to the input voltage $V_{IN}$) to a threshold. If the input voltage sense signal 535 is greater than the threshold, the dimmer circuit is conducting (corresponding to the ac input voltage $V_{AC}$ being connected to the power converter). If the input voltage sense signal 535 is less than the threshold, the dimmer circuit is not conducting (corresponding to the ac input voltage $V_{AC}$ not being connected to the power converter). In one example, the threshold is substantially $\frac{1}{5}^{th}$ of the peak value of the input voltage $V_{IN}$. However, it should be appreciated that the bleeder control circuit 534 may utilize other methods to determine if the dimmer circuit is conducting. If it is instead determined that the dimmer circuit is not conducting (and/or not performing dimming) or that the temperature is greater than the temperature threshold, bleeder enable circuit 552 may disable amplifier 550.

Both the input current sense signal 536 and the reference signal $U_{REF}$ 556 are received by the amplifier 550. The amplifier 550 outputs the bleeder signal $U_{BLEED}$ 538, which may be proportional to the difference between the reference signal $U_{REF}$ 556 and the input current sense signal 536 when the reference signal $U_{REF}$ 556 is greater than the input current sense signal 536. The amount of difference between the reference signal $U_{REF}$ 556 and the input current sense signal 536 determines the amount of bleed current $I_{BLD}$ provided by the controlled current source of the bleeder circuit. In one example, a greater difference between the reference signal $U_{REF}$ 556 and the input current sense signal 536 corresponds to a larger bleed current $I_{BLD}$. When the input current sense signal 536 is greater than the reference signal $U_{REF}$ 556, the bleeder signal $U_{BLEED}$ 538 (output of amplifier 550) is substantially equal to zero and the bleed current $I_{BLD}$ provided by the controlled current source of the bleeder circuit is also substantially equal to zero.

The reference generator 548 outputs the reference signal $U_{REF}$ 556 in response to the temperature signal 537. As will be further discussed with respect to FIG. 6, the reference signal $U_{REF}$ 556 is substantially constant for sensed temperatures less than a temperature threshold $T_{TH}$ 646 (which is one example of the temperature threshold $T_{TH}$ 446 in FIG. 4). When the sensed temperature is greater than the temperature threshold $T_{TH}$ 646, the reference generator 548 decreases the value of the reference signal $U_{REF}$ 556. The reference signal $U_{REF}$ 556 may be used to provide the value at which to regulate the input current $I_{IN}$ provided by the input current sense signal 536. As such, a reduction in the reference signal $U_{REF}$ 556 may reduce the input current $I_{IN}$ and the bleed current $I_{BLD}$ provided by the bleeder circuit. In other words, as the reference signal $U_{REF}$ 556 decreases with increasing temperature, it becomes more difficult to provide a non-zero bleed current $I_{BLD}$. As such, at temperatures greater than the temperature threshold $T_{TH}$, the bleeder current $I_{BLD}$ may be reduced to protect the components of the bleeder circuit.

Figure 6:
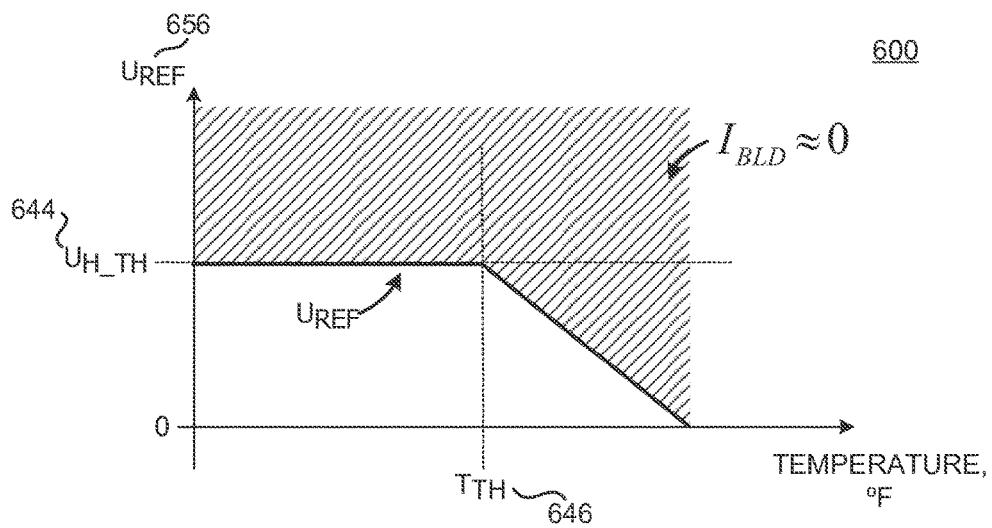
FIG. 6 is diagram illustrating an example reference signal over temperature according to various examples.

FIG. 6 illustrates a graph 600 of the reference signal $U_{REF}$ 656 with temperature and potential operating regions of the input current $I_{IN}$. The reference signal $U_{REF}$ 656 may be one example of the reference signal $U_{REF}$ 556 discussed with respect to FIG. 5. As illustrated, the reference signal $U_{REF}$ 656 is substantially equal to the holding current threshold $U_{H\_TH}$ 644 (which is representative of the holding current of the dimmer circuit and holding current threshold $I_{H\_TH}$) when the temperature is less than the temperature threshold $T_{TH}$ 646. The temperature threshold $T_{TH}$ 646 may be one example of the temperature threshold $T_{TH}$ 446 discussed with respect to FIG. 4. The reference signal $U_{REF}$ 656 decreases to substantially zero when the temperature is greater than the temperature threshold $T_{TH}$ 646. FIG. 6 illustrates a linear decrease, however, the reference signal $U_{REF}$ 656 may decrease non-linearly. As shown, the dashed area corresponds to the region of operation of the input current $I_{IN}$ in which the bleed current $I_{BLD}$ is substantially equal to zero when the input current sense signal is greater than the reference signal $U_{REF}$ 656. If the input current sense signal is less than the reference signal $U_{REF}$ 656, the amount of bleed current $I_{BLD}$ is proportional to the difference between the reference signal $U_{REF}$ 656 and the input current sense signal. In one example, the greater the difference between the reference signal $U_{REF}$ 656 and the input current sense signal the larger the value of the bleed current $I_{BLD}$. As shown in FIG. 6, when the temperature is greater than the temperature threshold $T_{TH}$ 646, the potential values of the input current $I_{IN}$ in which the value of the bleed current $I_{BLD}$ is substantially equal to zero increases. As such, the current through the bleeder circuit is reduced at temperatures greater than the temperature threshold $T_{TH}$ 646, which may protect the components of the bleeder circuit.

Figure 7:
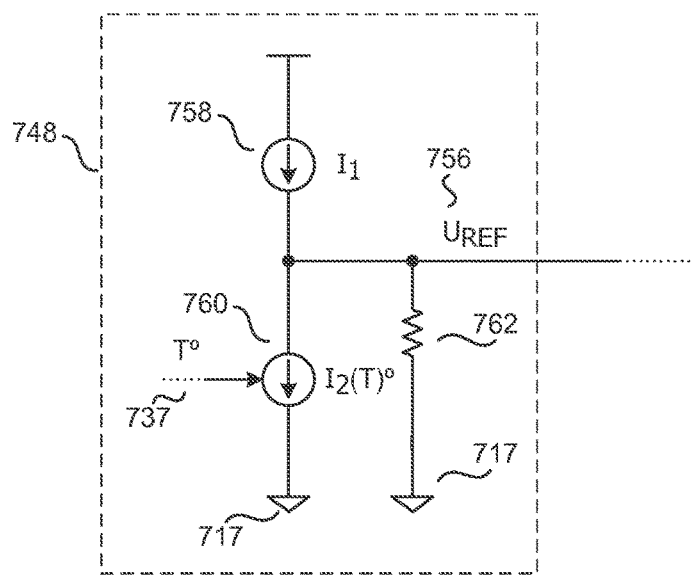
FIG. 7 is a functional block diagram of an example reference generator according to various examples.

FIG. 7 illustrates an example reference generator 748, which is one example of reference generator 548. The reference generator 748 includes current source 758 with current $I_1$, current source 760 with current $I_2$ (T°), and resistance 762. Further illustrated are the temperature signal 737 and the reference signal $U_{REF}$ 756. Current source 758 is coupled to one end of the current source 760, while the other end of current source 760 is coupled to return 717. One end of resistance 762 is coupled between current sources 758 and 760 while the other end of the resistance 762 is coupled to return 717. In other words, the resistance 762 is coupled to current sources 758 and 760 such that the current through the resistance 762 is substantially equal to the difference between current $I_1$ (provided by current source 758) and current $I_2$(T°) (provided by current source 760). As illustrated, the reference signal $U_{REF}$ 756 is the voltage across resistance 762. The current source 760 is further shown as a controlled current source that receives the temperature signal 737 and outputs the current $I_2$(T°) in response to the temperature signal. As will be discussed with respect to FIG. 8, the current $I_2$(T°) provided by current source 760 is substantially equal to zero when the temperature is less than the temperature threshold $T_{TH}$ and increases with temperature when the temperature is greater than the temperature threshold $T_{TH}$. Current $I_1$ provided by current source 758 is substantially constant over temperature. In one example, the current $I_1$ is substantially equal to the holding current threshold $I_{H\_TH}$.

When the temperature is less than the temperature threshold $T_{TH}$, the current through resistance 762 is substantially equal to the current $I_1$ of current source 758 and the reference signal $U_{REF}$ 756 is substantially constant. When the temperature is greater than the temperature threshold $T_{TH}$, the current through resistance 762 decreases with increasing current $I_2$(T°). As such, the reference signal $U_{REF}$ 756 decreases with increasing temperature. Once the current) $I_2$(T°) is greater than or equal to the current $I_1$, the current through resistance 762 is substantially equal to zero and the reference signal $U_{REF}$ 756 is also substantially equal to zero.

Figure 8:
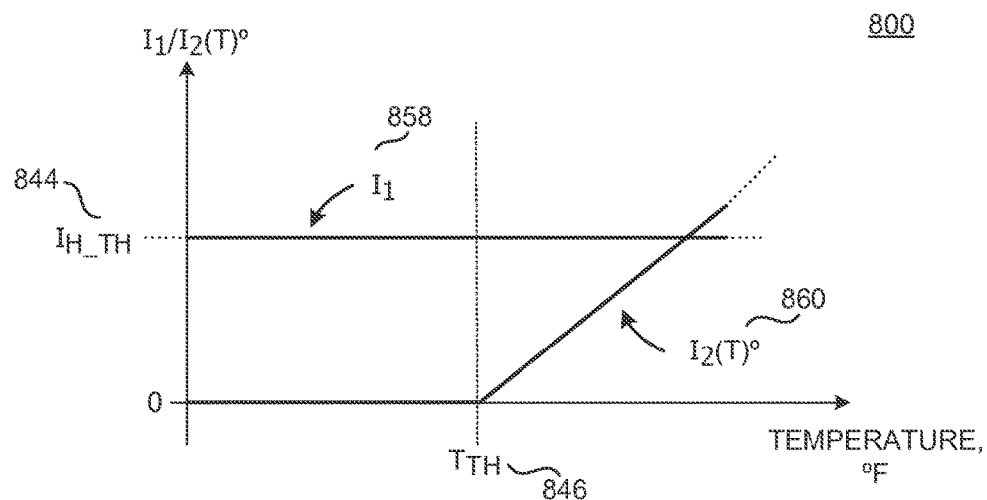
FIG. 8 is a diagram illustrating example first and second currents over temperature according to various examples.

FIG. 8 illustrates a graph 800 of the current $I_1$ 858 and current $I_2$(T°) 860, which maybe examples of the currents $I_1$ and $I_2$(T°) discussed with respect to FIG. 7. As illustrated, the current $I_1$ 858 is substantially constant and equal to the holding current threshold $I_{H_{TH}}$ 844 over temperature. The current $I_2(T°)$ 860 is substantially equal to zero for temperatures less than the temperature threshold $T_{TH}$ 846. For temperatures greater than the temperature threshold $T_{TH}$ 846, the current $I_2(T°)$ increases with increasing temperature. In one example, the increase is linear. However, the increase may be non-linear.

Figure 9:
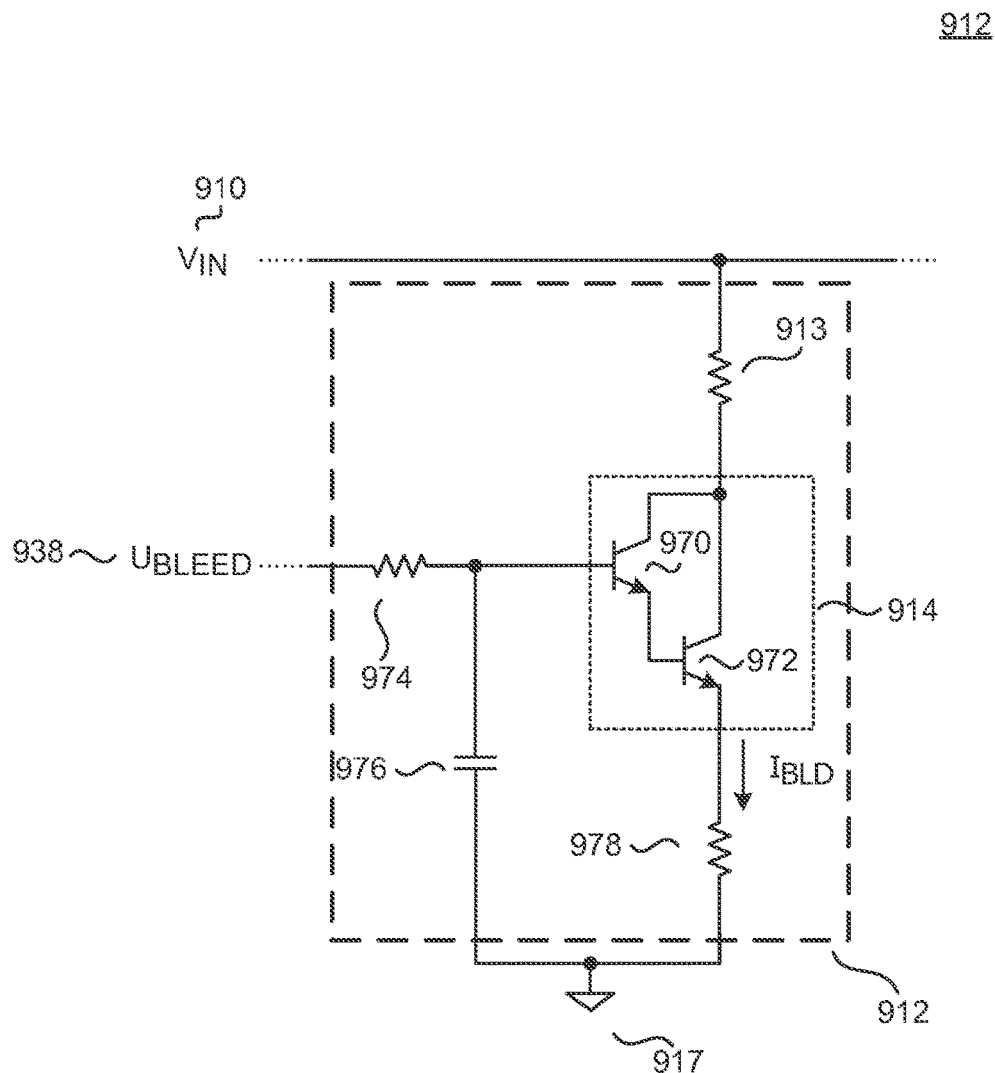
FIG. 9 is a functional block diagram of an example bleeder circuit generator according to various examples.

FIG. 9 illustrates an example bleeder circuit 912, which may be one example of the bleeder circuit 112. The bleeder circuit 912 includes resistance 913, controlled current source 914, resistances 974 and 978, and a capacitance 976. The controlled current source 914 is shown as including transistors 970 and 972 coupled together as a Darlington pair. In particular, the transistors 970 and 972 are illustrated as bipolar junction transistors (BJTs).

One end of resistance 913 is coupled to the controlled current source 914 (as illustrated, at the collector terminals 970 and 972) while the other end is coupled to the input voltage rail 910. The controlled current source 914 is further coupled to resistance 974 and 976 (as illustrated, at the base terminal of transistor 970). The controller is then further coupled to resistance 978 (at the emitter terminal of transistor 972). In addition, capacitance 976 and resistance 978 are shown as coupled to return 917. Bleeder signal $U_{BLEED}$ 938 (which is one example of the bleeder signals discussed above) is received at one end of the resistance 974.

The above description of illustrated examples of the present technology, including what is described in the Abstract, are not intended to be exhaustive or to be limitation to the precise forms disclosed. While specific embodiments of, and examples for, the present technology are described herein for illustrative purposes, various equivalent modifications are possible without departing from the broader spirit and scope of the present technology. Indeed, it is appreciated that the specific example voltages, currents, frequencies, power range values, times, etc., are provided for explanation purposes and that other values may also be employed in other embodiments and examples in accordance with the teachings of the present technology.

These modifications can be made to examples of the present technology in light of the above detailed description. The terms used in the following claims should not be construed to limit the present technology to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A bleeder control circuit for a controller of a power converter, wherein the bleeder control circuit is operable to receive an input current sense signal representative of an input current of the power converter and a temperature signal representative of a temperature of the power converter, wherein the bleeder control circuit is configured to output an adjustable bleeder control signal to control a bleeder current of a bleeder circuit of the power converter based at least in part on the input current sense signal and the temperature signal, wherein the bleeder control circuit is configured to output the bleeder control signal at a level that causes the bleeder current to be substantially equal to zero in response to the input current sense signal being greater than or equal to a reference signal, and wherein the bleeder control circuit is configured to output the bleeder control signal at a level that causes the bleeder current to be greater than zero in response to the input current sense signal being less than the reference signal.

2. The bleeder control circuit of claim 1, wherein the reference signal is equal to a first value when the temperature signal indicates that the temperature of the power converter is less than or equal to a temperature threshold, and wherein the reference signal is equal to a second value that is less than the first value when the temperature signal indicates that the temperature of the power converter is greater than the temperature threshold.

3. The bleeder control circuit of claim 2, wherein the first value corresponds to a holding current of a dimmer circuit of the power converter.

4. The bleeder control circuit of claim 2, wherein the second value is a variable value that decreases linearly with respect to increases in the temperature when the temperature signal indicates that the temperature of the power converter is greater than the temperature threshold.

5. The bleeder control circuit of claim 2, wherein the second value is a variable value that decreases non-linearly with respect to increases in the temperature when the temperature signal indicates that the temperature of the power converter is greater than the temperature threshold.

6. The bleeder control circuit of claim 1, wherein outputting the bleeder control signal at a level that causes the bleeder current to be greater than zero in response to the input current sense signal being less than reference signal comprises outputting the bleeder control signal at a level that causes the bleeder current to be equal to a value greater than zero based on a difference between the input current sense signal and the reference signal.

7. The bleeder control circuit of claim 1, wherein the bleeder control circuit comprises:
  a reference generator circuit operable to receive the temperature signal and configured to output a reference signal, wherein the reference signal is substantially constant when the temperature signal is less than a temperature threshold, and wherein the reference signal decreases with respect to increases in the temperature when the temperature signal is greater than the temperature threshold; and
  an amplifier operable to receive the input current sense signal at an inverting terminal of the amplifier and coupled to receive the reference signal at a non-inverting terminal of the amplifier, wherein the amplifier is configured to output the adjustable bleeder control signal based at least in part on the input current sense signal and the reference signal.

8. The bleeder control circuit of claim 7, wherein the bleeder control circuit further comprises:
  a bleeder enable circuit coupled to the amplifier and operable to receive the temperature signal and an input sense signal representative of an input of the power converter, wherein the bleeder enable circuit is configured to output a bleeder enable signal to the amplifier at a level that enables the amplifier in response to the input sense signal indicating that the dimmer circuit is connected to the input of the power converter and the temperature signal indicating that the temperature of the power converter is less than a shutdown temperature threshold, and wherein the bleeder enable circuit is configured to output the bleeder enable signal to the amplifier at a level that disables the amplifier in response to the input sense signal indicating that on the dimmer circuit is not connected to the input of the power converter or the temperature signal indicating that the temperature of the power converter is greater than or equal to the shutdown temperature threshold.

9. The bleeder control circuit of claim 7, wherein the reference generator circuit comprises:
a constant current source, wherein a first end of the constant current source is operable to be coupled to a supply of the power converter;
a resistor, wherein a first end of the resistor is coupled to a second end of the constant current source, and wherein a second end of the resistor is operable to be coupled to a return of the power converter; and
an adjustable current source operable to receive the temperature signal and configured to conduct an adjustable current based on the temperature signal, wherein a first end of the adjustable current source is coupled to the second end of the constant current source and the first end of the resistor, and wherein a second end of the adjustable current source is operable to be coupled to the return of the power converter.

10. A power converter comprising:
a bleeder circuit; and
a controller coupled to the bleeder circuit, wherein the controller comprises a bleeder control circuit operable to receive an input current sense signal representative of an input current of the power converter and a temperature signal representative of a temperature of the power converter, wherein the bleeder control circuit is configured to output an adjustable bleeder control signal to control a bleeder current of the bleeder circuit based at least in part on the input current sense signal and the temperature signal, wherein the bleeder control circuit is configured to output the bleeder control signal at a level that causes the bleeder current to be substantially equal to zero in response to the input current sense signal being greater than or equal to a reference signal, and wherein the bleeder control circuit is configured to output the bleeder control signal at a level that causes the bleeder current to be greater than zero in response to the input current sense signal being less than the reference signal.

11. The power converter of claim 10, wherein the reference signal is equal to a first value when the temperature signal indicates that the temperature of the power converter is less than or equal to a temperature threshold, and wherein the reference signal is equal to a second value that is less than the first value when the temperature signal indicates that the temperature of the power converter is greater than the temperature threshold.

12. The power converter of claim 11, wherein the power converter further comprises a dimmer circuit, and wherein the first value corresponds to a holding current of the dimmer circuit.

13. The power converter of claim 11, wherein the second value is a variable value that decreases linearly with respect to increases in the temperature when the temperature signal indicates that the temperature of the power converter is greater than the temperature threshold.

14. The power converter of claim 11, wherein the second value is a variable value that decreases non-linearly with respect to increases in the temperature when the temperature signal indicates that the temperature of the power converter is greater than the temperature threshold.

15. The power converter of claim 10, wherein outputting the bleeder control signal at a level that causes the bleeder current to be greater than zero in response to the input current sense signal being less than reference signal comprises outputting the bleeder control signal at a level that causes the bleeder current to be equal to a value greater than zero based on a difference between the input current sense signal and the reference signal.

16. The power converter of claim 10, wherein the bleeder control circuit comprises:
a reference generator circuit operable to receive the temperature signal and configured to output a reference signal, wherein the reference signal is substantially constant when the temperature signal is less than a temperature threshold, and wherein the reference signal decreases with respect to increases in the temperature when the temperature signal is greater than the temperature threshold; and
an amplifier operable to receive the input current sense signal at an inverting terminal of the amplifier and coupled to receive the reference signal at a non-inverting terminal of the amplifier, wherein the amplifier is configured to output the adjustable bleeder control signal based at least in part on the input current sense signal and the reference signal.

17. The power converter of claim 16, wherein the bleeder control circuit further comprises:
a bleeder enable circuit coupled to the amplifier and operable to receive the temperature signal and an input sense signal representative of an input of the power converter, wherein the bleeder enable circuit is configured to output a bleeder enable signal to the amplifier at a level that enables the amplifier in response to the input sense signal indicating that on the dimmer circuit is connected to the input of the power converter and the temperature signal indicating that the temperature of the power converter is less than a shutdown temperature threshold, and wherein the bleeder enable circuit is configured to output the bleeder enable signal to the amplifier at a level that disables the amplifier in response to the input sense signal indicating that the dimmer circuit is not connected to the input of the power converter or the temperature signal indicating that the temperature of the power converter is greater than or equal to the shutdown temperature threshold.

18. The power converter of claim 16, wherein the reference generator circuit comprises:
a constant current source, wherein a first end of the constant current source is operable to be coupled to a supply of the power converter;
a resistor, wherein a first end of the resistor is coupled to a second end of the constant current source, and wherein a second end of the resistor is operable to be coupled to a return of the power converter; and
an adjustable current source operable to receive the temperature signal and configured to conduct an adjustable current based on the temperature signal, wherein a first end of the adjustable current source is coupled to the second end of the constant current source and the first end of the resistor, and wherein a second end of the adjustable current source is operable to be coupled to the return of the power converter.

* * * * *